US007198704B2

(12) United States Patent
Cohen et al.

(10) Patent No.: US 7,198,704 B2
(45) Date of Patent: Apr. 3, 2007

(54) METHODS OF REDUCING INTERLAYER DISCONTINUITIES IN ELECTROCHEMICALLY FABRICATED THREE-DIMENSIONAL STRUCTURES

(75) Inventors: Adam L. Cohen, Los Angeles, CA (US); Michael S. Lockard, Lake Elizabeth, CA (US); Dennis R. Smalley, Newhall, CA (US)

(73) Assignee: Microfabrica Inc., Van Nuys, CA (US)

( * ) Notice: Subject to any disclaimer, the term of this patent is extended or adjusted under 35 U.S.C. 154(b) by 40 days.

(21) Appl. No.: 10/830,262

(22) Filed: Apr. 21, 2004

(65) Prior Publication Data

US 2004/0251142 A1    Dec. 16, 2004

Related U.S. Application Data

(60) Provisional application No. 60/464,504, filed on Apr. 21, 2003.

(51) Int. Cl.
*C25D 5/02*    (2006.01)
(52) U.S. Cl. .................. 205/118; 205/135; 204/224 M
(58) Field of Classification Search .............. 205/118, 205/135, 170, 120, 122; 204/224 R, 224 M
See application file for complete search history.

(56) References Cited

U.S. PATENT DOCUMENTS

| 6,027,630 | A | * | 2/2000 | Cohen | 205/135 |
| 2004/0129573 | A1 | * | 7/2004 | Cohen | 205/170 |
| 2004/0134788 | A1 | * | 7/2004 | Cohen et al. | 205/135 |

* cited by examiner

*Primary Examiner*—Nam Nguyen
*Assistant Examiner*—Luan V. Van
(74) *Attorney, Agent, or Firm*—Dennis R. Smalley

(57) ABSTRACT

Disclosed methods reduce the discontinuities between individual layers of a structure that are formed at least in part using electrochemical fabrication techniques. Discontinuities may exist between layers of a structure as a result of up-facing or down-facing regions defined in data descriptive of the structure or they may exist as a result of building limitations, e.g., limitations that result in non-parallel orientation between a building axis and sidewall surfaces of layers. Methods for reducing discontinuities may be applied to all regions or only to selected regions of the structure. Methods may be tailored to improve the accuracy between an original design of the structure and the structure as fabricated or they may simply be used to smooth the discontinuities between layers. Methods may include deposition operations that selectively favor filling of the discontinuities and/or etching operations that selectively favor removal of material from protrusions that define discontinuities.

20 Claims, 14 Drawing Sheets

METHODS OF REDUCING INTERLAYER DISCONTINUITIES IN ELECTROCHEMICALLY FABRICATED THREE-DIMENSIONAL STRUCTURES

RELATED APPLICATIONS

This application claims benefit of U.S. Provisional Patent Application No. 60/464,504, filed on Apr. 21, 2003. This referenced application is hereby incorporated herein by reference as if set forth in full herein.

FIELD OF THE INVENTION

The present invention relates generally to the formation of three-dimensional structures using electrochemical fabrication methods via a layer-by-layer build up of deposited materials, and more particularly where such structures are formed with reduction in discontinuities between layers or between selected portions of selected layers.

BACKGROUND OF THE INVENTION

A technique for forming three-dimensional structures (e.g. parts, components, devices, and the like) from a plurality of adhered layers was invented by Adam L. Cohen and is known as Electrochemical Fabrication. It is being commercially pursued by Microfabrica® Inc. (formerly MEMGen® Corporation) of Burbank, Calif. under the name EFAB®. Certain variations of this technique were described in U.S. Pat. No. 6,027,630, issued on Feb. 22, 2000. The disclosed electrochemical deposition techniques allow the selective deposition of a material using a unique masking technique that involves the use of a mask that includes patterned conformable material on a support structure that is independent of the substrate onto which plating will occur. When desiring to perform an electrodeposition using the mask, the conformable portion of the mask is brought into contact with a substrate while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. (formerly MEMGen® Corporation) of Burbank, Calif. such masks have come to be known as INSTANT MASKS™ and the process known as INSTANT MASKING™ or INSTANT MASK™ plating. Selective depositions using conformable contact mask plating may be used to form single layers of material or may be used to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p 244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFABTM)", Chapter 19 of The MEMS Handbook, edited by Mohamed Gad-EI-Hak, CRC Press, 2002.

(9) Microfabrication—Rapid Prototyping's Killer Application", pages 1–5 of the Rapid Prototyping Report, CAD/CAM Publishing, Inc., June 1999.

The disclosures of these nine publications are hereby incorporated herein by reference as if set forth in full herein.

The electrochemical deposition process may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate.

2. Then, blanket depositing at least one additional material by electrodeposition so that the additional deposit covers both the regions that were previously selectively deposited onto, and the regions of the substrate that did not receive any previously applied selective depositions.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to the immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated. At least one CC mask is needed for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first-operation, the conformable portion of the CC mask is placed in registration with and pressed against a selected portion of the substrate (or onto a previously formed layer or onto a previously deposited portion of a layer) on which deposition is to occur. The pressing together of the CC mask and substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A–1C. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 1A also depicts a substrate 6 separated from mask 8. CC mask plating selectively deposits material 22 onto a substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1C. The CC mask plating process is distinct from a "through-mask" plating process in that in a through-mask plating process the separation of the masking material from the substrate would occur destructively. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D–1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the fabrication of the substrate on which plating is to occur (e.g. separate from a three-dimensional (3D) structure that is being formed). CC masks may be formed in a variety of ways, for example, a photolithographic process may be used. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A–2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e.

sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A–3C. The system 32 consists of several subsystems 34, 36, 38, and 40. The substrate holding subsystem 34 is depicted in the upper portions of each of FIGS. 3A–3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing mask exposures. A first layer of a primary metal is electroplated onto an exposed plating base to fill a void in a photoresist, the photoresist is then removed and a secondary metal is electroplated over the first layer and over the plating base. The exposed surface of the secondary metal is then machined down to a height which exposes the first metal to produce a flat uniform surface extending across the both the primary and secondary metals. Formation of a second layer may then begin by applying a photoresist layer over the first layer and then repeating the process used to produce the first layer. The process is then repeated until the entire structure is formed and the secondary metal is removed by etching. The photoresist is formed over the plating base or previous layer by casting and the voids in the photoresist are formed by exposure of the photoresist through a patterned mask via X-rays or UV radiation.

Even though electrochemical fabrication methods as taught and practiced to date, have been proposed for the production of structures (e.g. devices, parts, components, etc.) in a variety of fields and applications, use in some of those applications can be enhanced by or benefit from a reduction in the discontinuities that exist between layers that have boundaries that do not overlay one another. As such a need exists in the field for enhanced production methods that lead to a reduced size of these discontinuities or improved smoothness of the layer-to-layer transitions.

SUMMARY OF THE INVENTION

It is an object of various aspects of the invention to provide enhanced electrochemical fabrication techniques that help reduce the size of or otherwise to smooth out layer-to-layer discontinuities.

It is an object of various aspects of the invention to provide enhanced electrochemical fabrication techniques that help reduce the size of or otherwise to smooth out layer-to layer discontinuities for some layers or portions of layers while leaving the layer-to-layer discontinuities for other layers or other portions of layers un-modified It is an object of various aspects of the invention to provide enhanced electrochemical fabrication techniques that decrease the size of discontinuities or enhance the smoothness of discontinuities in structural material whether or not the discontinuities result from layer quantization or from intra-layer design or from data format introduced features.

It is an object of various aspects of the invention to provide enhanced electrochemical fabrication techniques that decrease the size of discontinuities or enhance the smoothness of discontinuities in structural material during the layer by layer formation process.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively they may address some other object of the invention that may be ascertained from the teachings herein. It is not intended that all objects be addressed by any single aspect of the invention even though that may be the case with regard to some aspects.

In a first aspect of the invention a method for electrochemically forming a 3D structure from a plurality of adhered layers of a structural material includes: providing a substrate; forming a layer including at least a first material that is electrodeposited on to the substrate; forming subsequent layers adhered to previously formed layers wherein either the quantization of layers results in unintended interlayer discontinuities or build processes result in interlayer discontinuities; and wherein prior to completing formation of all layers or after completing formation of all layers, performing at least one operation that results in the reduction of an interlayer discontinuity.

In a second aspect of the invention a method for electrochemically forming a 3D structure, includes: providing a substrate; forming a layer including at least a first material that is electrodeposited on to the substrate; forming subsequent layers adhered to previously formed layers wherein either the quantization of layers results in unintended interlayer discontinuities or build processes result in interlayer discontinuities; and wherein prior to completing formation of all layers or after completing formation of all layers, performing at least one operation that results in the reduction of an interlayer discontinuity, and wherein the layer-by-layer deposition process creates a tool, and wherein the three-dimensional structure is formed using at least one electrodeposition operation and the tool.

Further aspects of the invention will be understood by those of skill in the art upon reviewing the teachings herein. Other aspects of the invention may involve combinations of the above noted aspects of the invention. These other aspects of the invention may provide various combinations of the aspects, embodiments, and associated alternatives explicitly set forth herein as well as provide other configurations, structures, functional relationships, and processes that have not been specifically set forth above.

BRIEF DESCRIPTION OF THE DRAWINGS

FIGS. 1A–1C schematically depict side views of various stages of a CC mask plating process, while

FIG. 7(a) depicts a five layer portion of a structure having vertical side walls while

DETAILED DESCRIPTION OF PREFERRED EMBODIMENTS OF THE INVENTION

FIGS. 1A–1G, 2A–2F, and 3A–3C illustrate various features of one form of electrochemical fabrication that are known. Other electrochemical fabrication techniques are set forth in the '630 patent referenced above, in the various previously incorporated publications, in various other patents and patent applications incorporated herein by reference, still others may be derived from combinations of various approaches described in these publications, patents, and applications, or are otherwise known or ascertainable by those of skill in the art from the teachings set forth herein. All of these techniques may be combined with those of the various embodiments of the invention to yield enhanced embodiments. Still other embodiments may be derived from combinations of the various embodiments explicitly set forth herein.

Figure 4A:
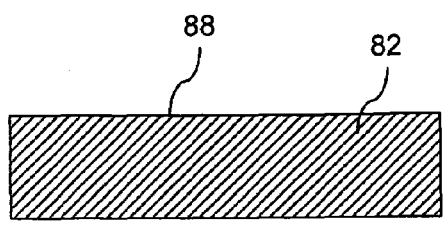
FIGS. 4A–4F schematically depict the formation of a first layer of a structure using adhered mask plating where the blanket deposition of a second material overlays both the openings between deposition locations of a first material and the first material itself
Figure 4B:
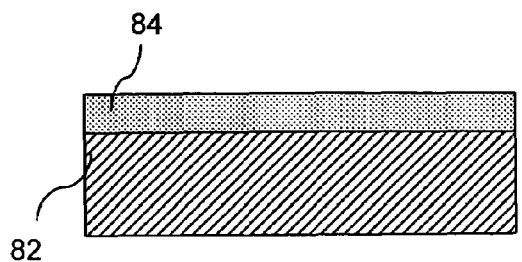
Figure 4C:
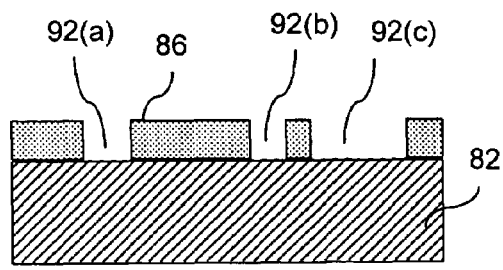
Figure 4D:
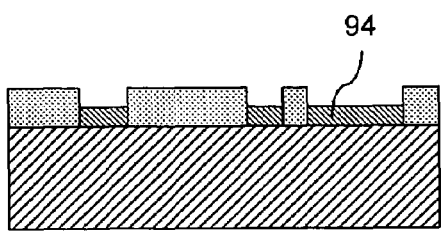
Figure 4E:
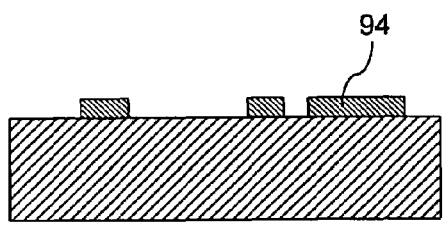
Figure 4F:
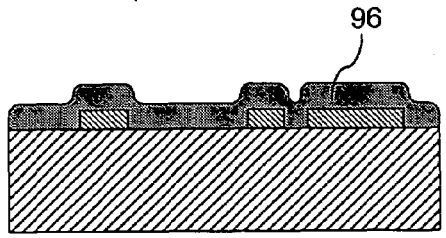
Figure 4G:
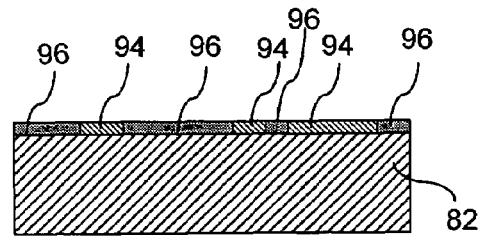
FIG. 4G depicts the completion of formation of the first layer resulting from planarizing the deposited materials to a desired level.
Figure 4H:
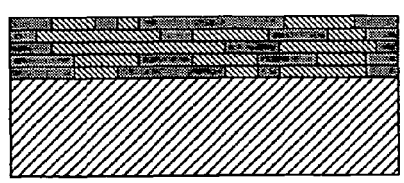
FIGS. 4H and 4I respectively depict the state of the process after formation of the multiple layers of the structure and after release of the structure from the sacrificial material.
Figure 4I:
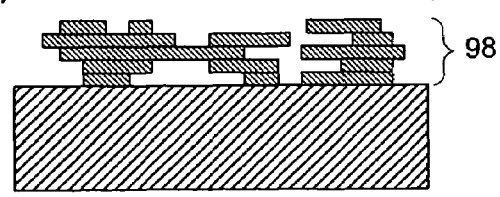

FIGS. 4A–4I illustrate various stages in the formation of a single layer of a multi-layer fabrication process where a second metal is deposited on a first metal as well as in openings in the first metal so that the first and second metal form part of the layer. In FIG. 4A a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)–92(c) extending from a surface 86 of the photoresist through the thickness of the photoresist to surface 88 of the substrate 82. In FIG. 4D a metal 94 (e.g. nickel) is shown as having been electroplated into the openings 92(a)–92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B–4G several times to form a multi-layer structure are shown where each layer consists of two materials. For most applications, one of these materials is removed as shown in FIG. 4I to yield a desired 3-D structure 98 (e.g. component or device).

DEFINITIONS

In the present application, the following terms shall have the have meanings set forth hereafter.

The "build axis" or "build orientation" is the axis or orientation that is perpendicular to the planes of the layers that are used in building up structures.

An "up-facing feature" is an element dictated by the cross-sectional data for a given layer "n" and a next layer "n+1" that is to be formed from a structural material that exists on the layer "n" but does not exist on the immediately succeeding layer "n+1". For convenience the term "up-facing feature" will apply to such features regardless of whether the layers are stacked one above the other, one below the other, or along any other oriented build axis.

A "down-facing feature" is an element dictated by the cross-sectional data for a given layer "n" and a preceding layer "n−1" that is to be formed from a structural material that exists on layer "n" but does not exist on the immediately preceding layer "n−1". As with up-facing features, the term "down-facing feature" shall apply to such features regardless of whether the layers are stacked one above the other, one below the other, or along any other oriented build axis.

A "continuing region" is the portion of a given layer "n" that is dictated by the cross-sectional data for a given layer "n", a next layer "n+1" and a preceding layer "n−1" that is neither up-facing nor down-facing for that layer "n".

Figure 5:
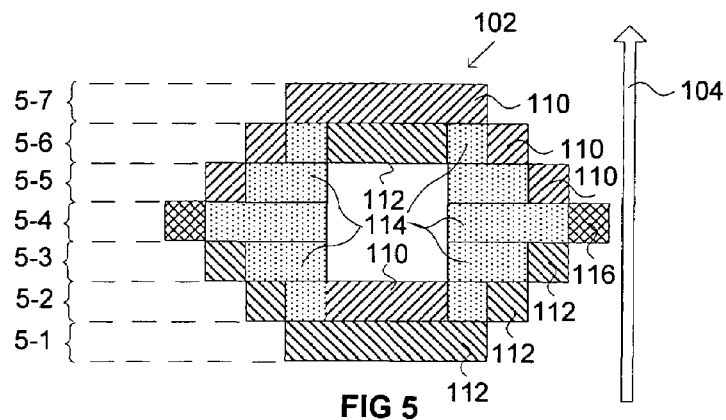
FIG. 5 depicts a side view of a structure 102 formed from a plurality of layers where the layers are stacked on top of one another along build axis and the build axis is substantially perpendicular to the planes of the layers.

FIG. 5 depicts a side view of a structure 102 formed from a plurality of layers 5-1 to 5-7 where the layers are stacked on top of one another along build axis 104 where the build axis is substantially perpendicular to the planes of the layers. The example of FIG. 5 assumes that the structure is formed from a single structural material. The sacrificial material used in the formation of the structure 102 is not shown for the sake of clarity. Depending on the configuration of each layer, relative to its neighboring layers, each layer may include one or more types of regions, i.e. up-facing regions 110, down-facing regions 112, continuing regions 114, and/or combination up-facing and down-facing regions 116. In the particular, for example, layer 5-1 includes a single down-facing region 112; layer 5-2 includes two down-facing regions 112, an up-facing region 110, and two continuing regions 114; layer 5-4 includes two combination regions 146 and two continuing regions 144; and layer 5-7 includes only an up-facing region 110.

In some embodiments, a number of distinct sub-categories of up-facing and down-facing features may be defined: (1) Some up-facing and/or down-facing features may be intended by the original 3D data for the structure or may otherwise be known as desired in the structure and such regions, when necessary or appropriate, shall be termed "horizontal up-facing features" or "horizontal down-facing features" regardless of the build orientation; (2) Some up-facing and/or down-facing features may result from the quantization of "slanted or non-vertical features" of the structure and shall be termed as "slanted up-facing features" and/or "slanted down-facing features"; (3) Some up-facing and/or down-facing features and/or combination up-facing and down-facing features may come into existence, or be expanded, or disappear, or shrink as a result of misregistration of successive layers and shall be termed "offset up-facing features" and/or "offset down-facing features" and/or "offset combination features"; and (4) Some continuing, up-facing, and/or down-facing regions of layers may take on configurations having down-facing or up-facing slopes (e.g. when layers are formed with non-vertical sidewalls) and shall be termed "down-facing non-vertical sidewall features" and "up-facing non-vertical sidewall features", respectively.

Figure 6A:
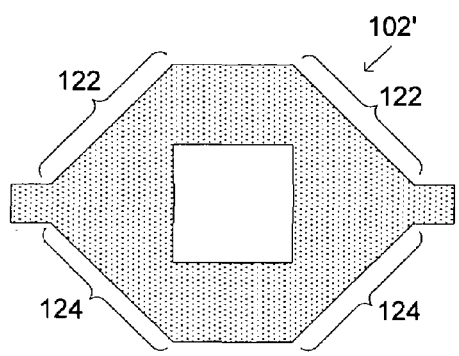
FIGS. 6(a)–6(d) illustrate the distinction between "horizontal up-facing features" and "slanted up-facing features" as well as "horizontal down-facing features" and "slanted down-facing features".
Figure 6B:
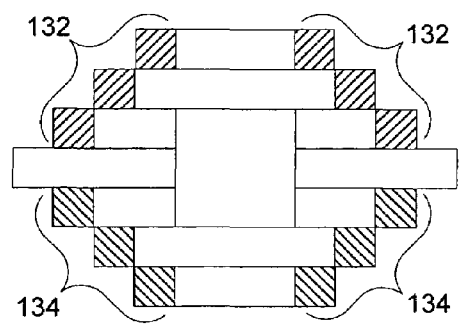
Figure 6C:
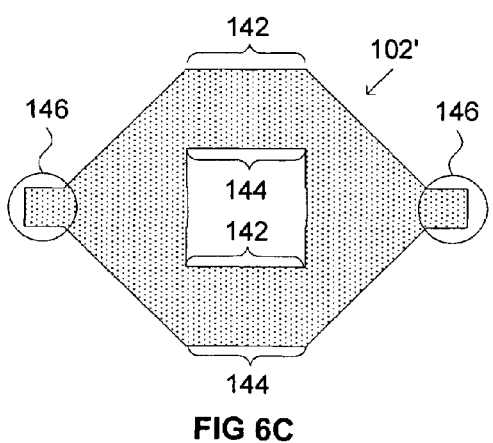
Figure 6D:
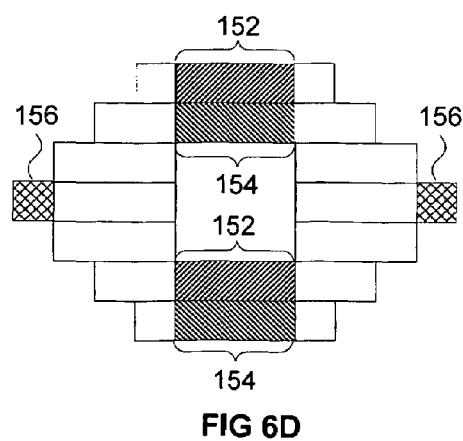

FIGS. 6A–6D illustrate the distinction between "horizontal up-facing features" and "slanted up-facing features" as well as "horizontal down-facing features" and "slanted down-facing features". FIG. 6A depicts a side view of a designed structure 102' which upon formation on a layer-by-layer basis may become structure 102 since sloped or slanted regions 122 and 124 may become up-facing regions 132 and down-facing regions 134 respectively as shown in FIG. 6B. Horizontal up-facing regions 142 and horizontal down-facing regions 144 in designed structure 102', as shown in FIG. 6C, become up-facing and down-facing regions 152 and 154 respectively in structure 102, as shown in FIG. 6D, and combination regions 146 in designed structure 102' become combination regions 156 in structure 102, as shown in FIG. 6D.

Figure 7A:
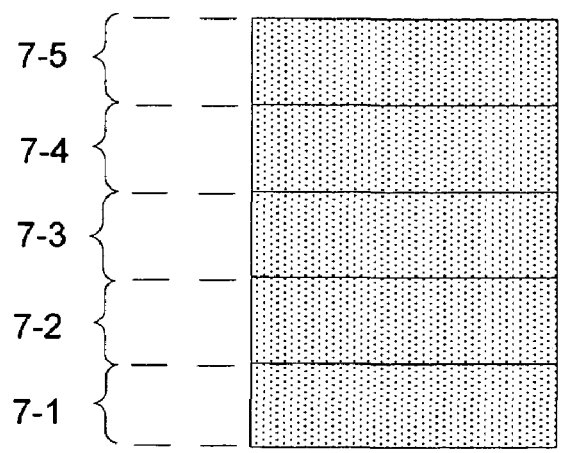
Figure 7B:
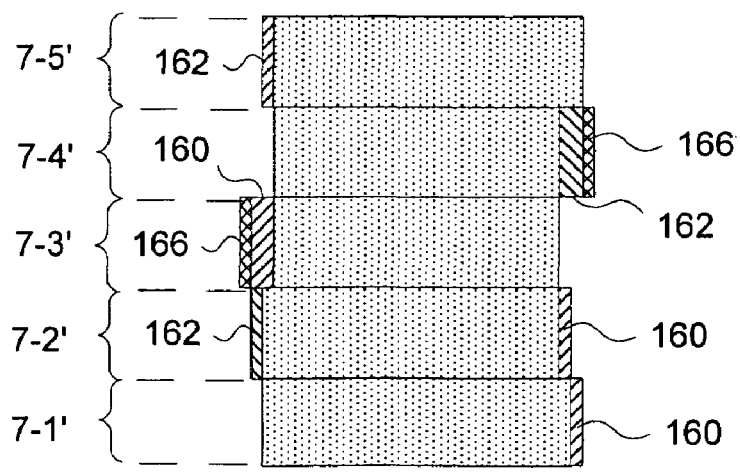
FIG. 7(b) depicts examples of offset up-facing features, offset down-facing features, and offset combination features that result from misregistration of the layers.

FIG. 7A depicts a five layer, layers 7-1 to 7-5, portion of a structure having vertical side walls while FIG. 7B depicts offset up-facing features 160, offset down-facing features 162, and offset combination features 166 that result from misregistration of layers 7-1' to 7-5'.

Figure 8A:
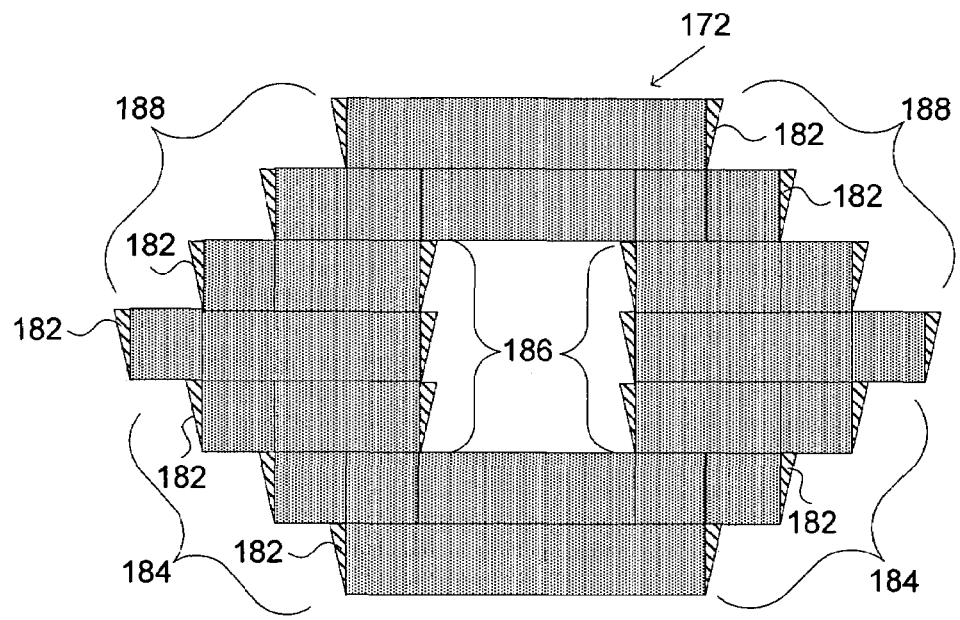
FIGS. 8(a) and 8(b) depict structures having sloped down-facing and up-facing regions, respectively, that can result from layer fabrication processes that do not yield completely vertical sidewalls.
Figure 8B:
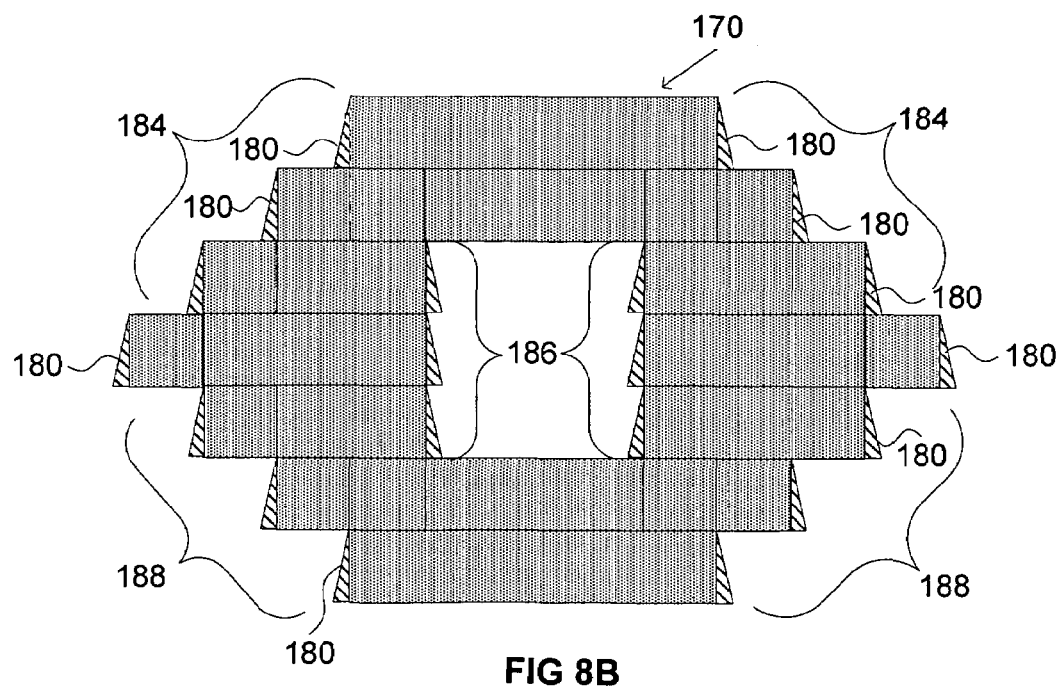

FIGS. 8A and 8B depict structures having sloped down-facing and up-facing regions, respectively, that can result from layer fabrication processes that do not yield completely vertical sidewalls. FIG. 8A depicts a structure 172 formed using a process that forms sidewalls 182 having a slight downward facing slope while FIG. 8B depicts a structure 170 formed using a process that forms sidewalls 180 having a slight upward facing slope. It can be seen that in some layer-to-layer configurations the sloping sidewalls can tend to provide some discontinuity reduction, e.g. regions 184, while in other layer configurations the sloping sidewalls yield non-vertical, non-coincident sidewall surfaces, e.g. regions 186, while in still other cases the discontinuity problem is exacerbated, e.g. regions 188.

An "intra-layer discontinuity" is a discontinuity in slope between two surfaces that meet along a given line within a layer and which may or may not be modified by various embodiments of the present invention.

Some embodiments of the invention may reduce all discontinuities in a structure with non-selective indifference (e.g. discontinuities between layers and even intra-layer discontinuities) while other embodiments may implement discontinuity reduction in such a manner that only discontinuities associated with selected structural features are reduced, e.g. discontinuities associated with slanted up-facing features and/or slanted down-facing features may be reduced. Still other embodiments, may additionally or alternatively attack discontinuities associated with offset up-facing, offset down-facing, and/or offset combinations features. Still further embodiments may attempt to smooth discontinuities originating as a result of layer fabrication methods that do not form sufficiently vertical sidewalls on layers (i.e. sidewalls that whose surface normals are not perpendicular to the build axis)

First Group of Embodiments

In a first group of embodiments discontinuity reduction occurs by increasing the number of effective layers from which the structure is formed. These methods reduce discontinuities by reducing layer thickness in at least those regions where minimum stair stepping is required or desired. In some variations of this embodiment, the number of distinct deposition or etching masks used is less than the number of distinct cross-sections needed. In still other variations, the number of distinct photomasks used for creating etching or deposition masks is less than the number of distinct etching or deposition masks used.

Figure 9A:
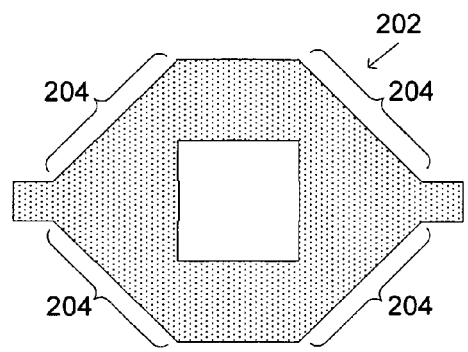
FIGS. 9(a)–9(e) illustrate how discontinuities can be reduced in regions where thinner layers are used.
Figure 9B:
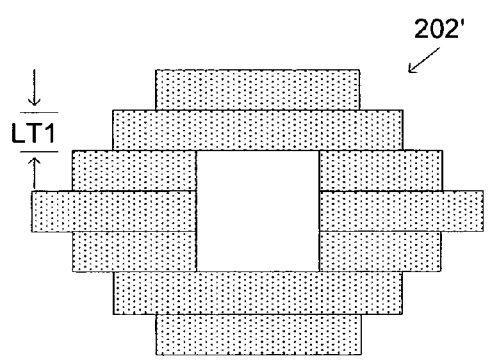
Figure 9C:
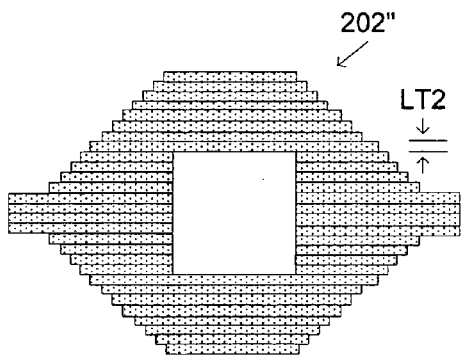
Figure 9D:
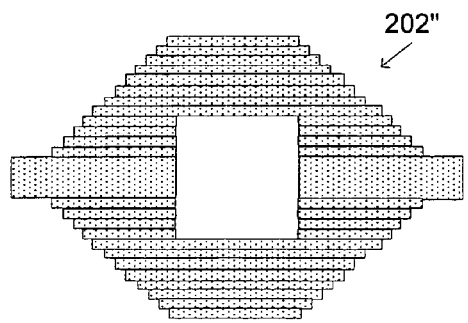
Figure 9E:
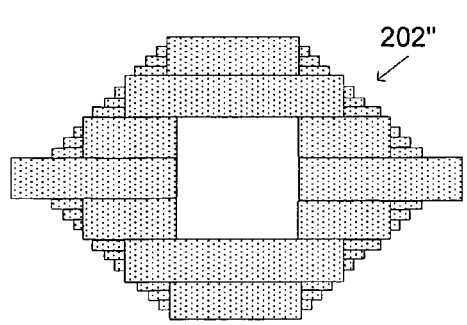

FIGS. 9A–9E illustrate how discontinuities can be reduced in regions where thinner layers are used. FIG. 9A depicts a side view of a structure 202 as designed. Structure 202 includes slanted regions 204 which will include unintended discontinuities when the structure is formed from a plurality of adhered layers. FIG. 9B depicts a structure 202' which is formed using a first larger layer thickness, LT1, when forming regions containing undesired discontinuities. FIG. 9D depicts structure 202" which is formed using a second, smaller layer thickness for all layers. FIG. 9D depicts structure 202" formed using thin layers for those layers containing regions of undesired discontinuities. FIG. 9E depicts structure 202" formed using another alternative embodiment where only those portions of the layers that contain undesired discontinuities are formed with thin layers while other portions of the layers are formed from thicker depositions of material. The embodiment of FIG. 9E may be implemented using the interlacing techniques set forth in U.S. patent application Ser. No. 10/434,519 filed May 7, 2003 by Dennis R. Smalley and entitled "Methods of and Apparatus for Electrochemically Fabricating Structures Via Interlaced Layers or Via Selective Etching and Filling of Voids". This referenced application is incorporated herein by reference as if set forth in full herein. It can be seen from a comparison of structures 202, 202', and 202" that use of finer layer thicknesses, on at least relevant portions of layer, can yield significant reductions in undesired discontinuities.

For example, a first embodiment of the first group of embodiments may be implemented using photomasks that are orbited during formation of the deposition masks, the depositions masks can thereby be made to take on sizes which are larger than that of the photomask. Such use of orbiting photomasks may be used to reduce (i.e. to a value less than that dictated by the number of layers required and the number of distinctly sized or patterned selective deposition masks and/or selective etching masks needed to form the structure of desired resolution. Similarly, if deposition masks or etching masks are used in a contact mode (as opposed to an adhered mode) along with multiple, offset, partial layer thickness depositions or etching operations, reduced discontinuities between layers may be achieved. If deposition masks or etching masks are used in a proximity mode, it may be possible to orbit them during deposition or etching to yield layer thickness depositions or holes having sloped sidewalls. More detail about the use of offset contact and proximity masks and associated variations in deposition patterns and/or etching depth patterns may be found in U.S. patent application Ser. No. 10/677,498 filed Oct. 1, 2003, by Cohen, et al., and entitled "Multi-cell Masks and Methods and Apparatus for Using Such Masks to Form Three-Dimensional Structures". In still other variations of the first embodiment, a photomask may be used to produce different sized deposition or etching masks by adjusting the focus of the image of a photomask on the deposition or etching mask material. [NOTE THERE IS NO MENTION OF INC BY REFERENCE]

Figure 1A:
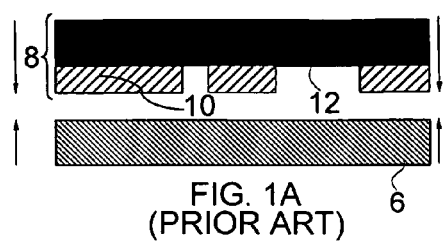
Figure 1B:
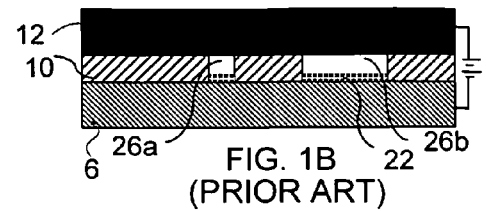
Figure 1C:
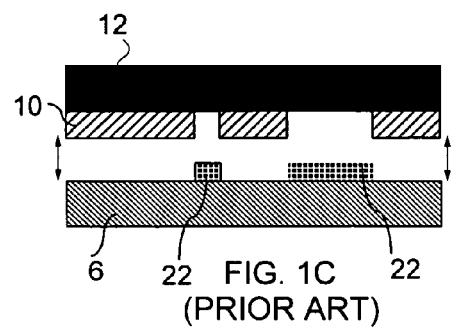
Figure 1D:
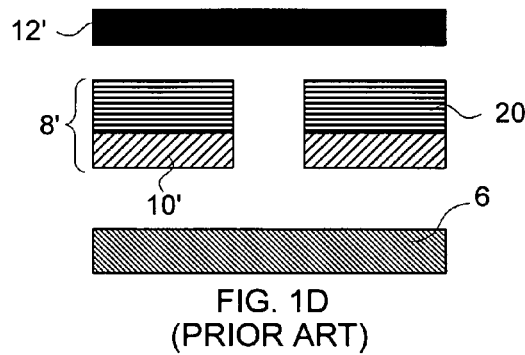
FIGS. 1D–1G depict side views of various stages of a CC mask plating process using a different type of CC mask.
Figure 1E:
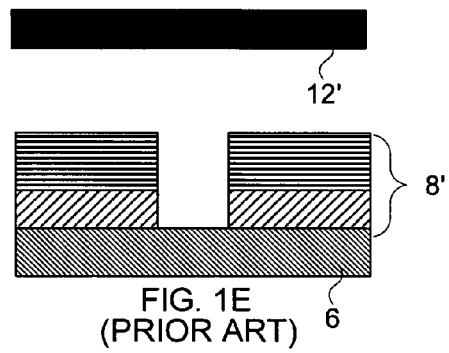
Figure 1F:
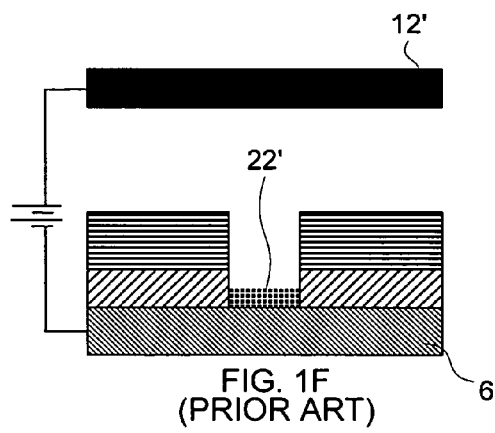
Figure 1G:
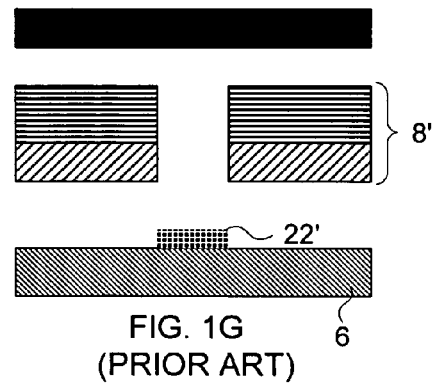
Figure 2A:
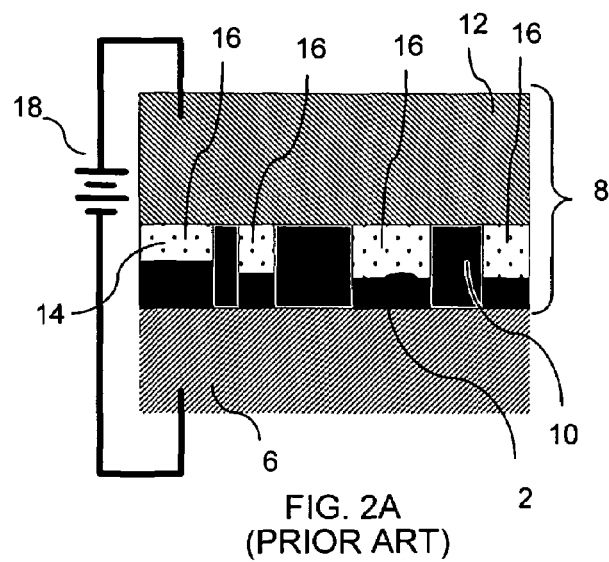
FIGS. 2A–2F schematically depict side views of various stages of an electrochemical fabrication process as applied to the formation of a particular structure where a sacrificial material is selectively deposited while a structural material is blanket deposited.
Figure 2B:
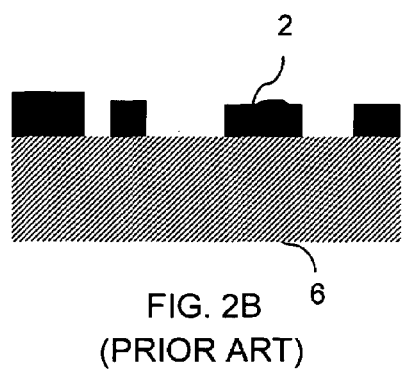
Figure 2C:
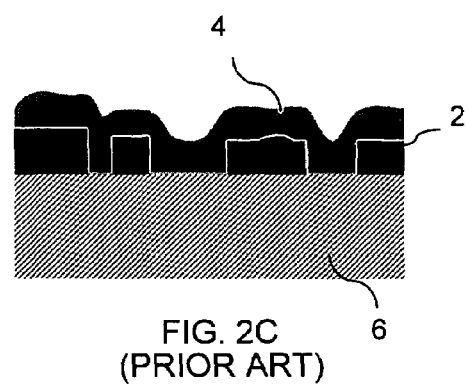
Figure 2D:
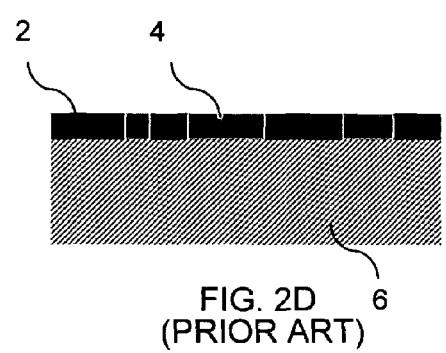
Figure 2E:
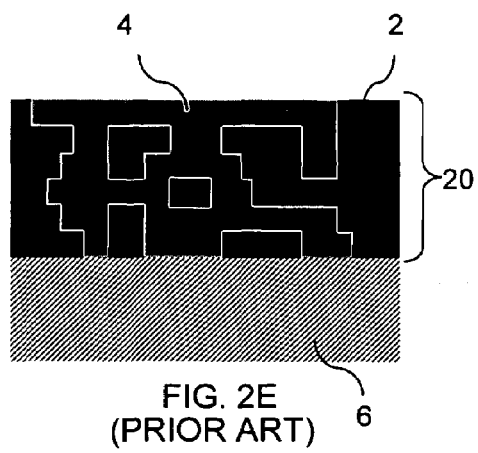
Figure 2F:
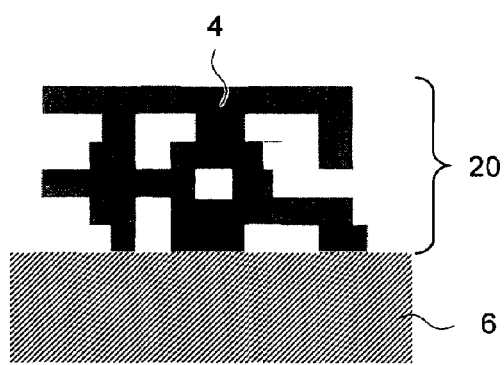
Figure 3A:
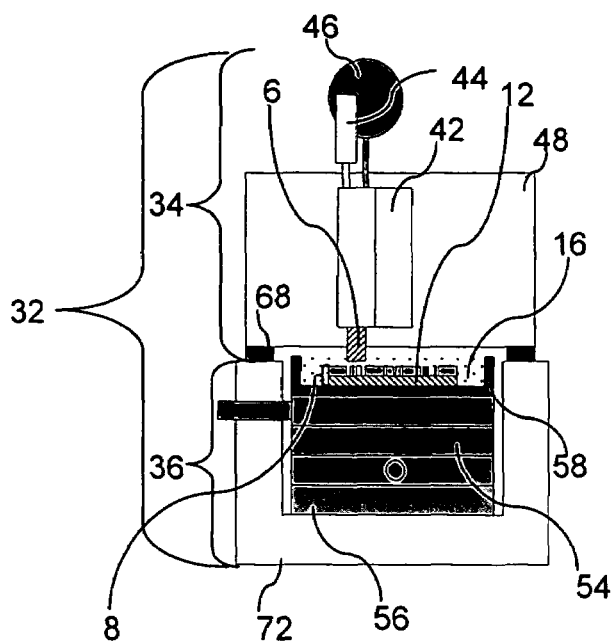
FIGS. 3A–3C schematically depict side views of various example subassemblies that may be used in manually implementing the electrochemical fabrication method depicted in FIGS. 2A–2F.
Figure 3B:
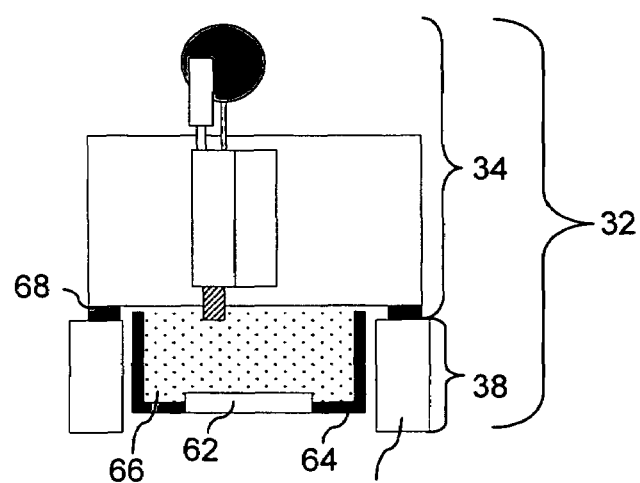
Figure 3C:
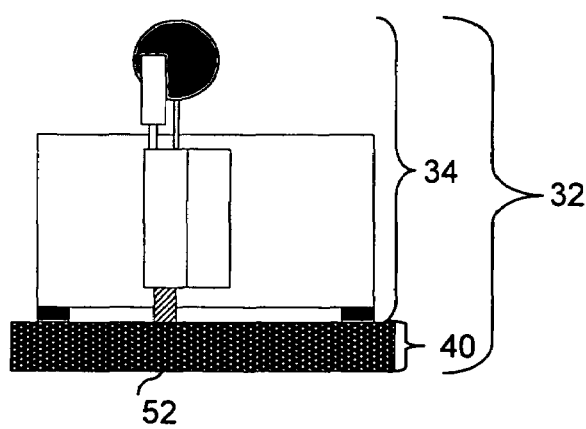
Figure 10A:
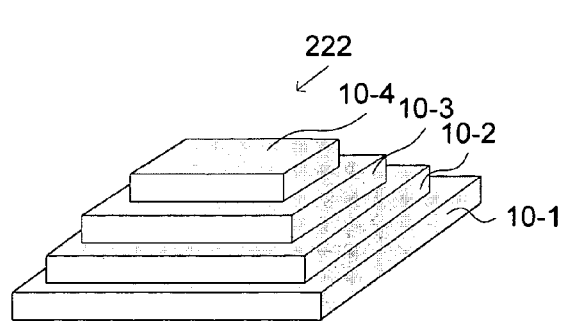
FIGS. 10(a)–10(f) illustrate how a single orbiting photomask may be used to form multiple layers of varying sizes.
Figure 10B:
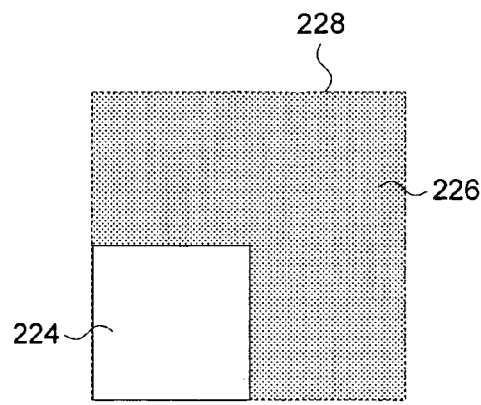
Figure 10C:
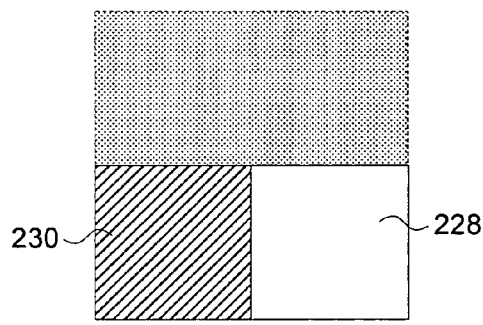
Figure 10D:
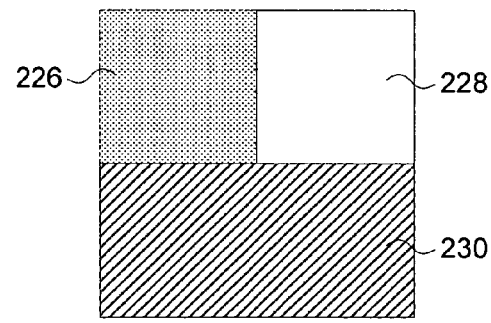
Figure 10E:
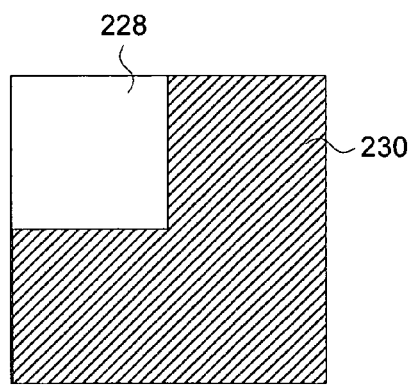
Figure 10F:
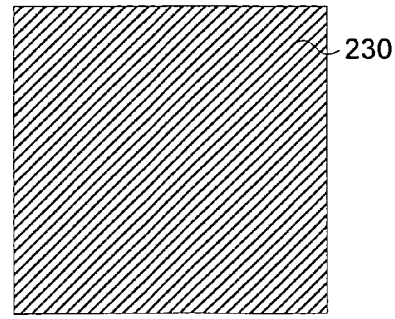

FIGS. 10A–10F illustrate how a single orbiting photomask may be used to form multiple layers of varying sizes. FIG. 10A depicts four layers, 10-1 to 10-4, of a structure 222 where the four layers as a whole may be considered to represent a single thicker layer of the structure but where it is desired that the thicker layer actually be formed as a plurality of thinner layers each with a slightly modified cross-sectional size so that discontinuity reduction may be achieved when forming the structure. Instead of producing a photomask for use in forming each of four deposition masks (e.g. photoresist masks that are adhered to a substrate), it may be possible to produce a single photomask having an opening 224 the size of cross-section 10-4. The single photomask may be used multiple times to form a deposition mask (e.g. exposed and then developed photoresist) corresponding to each of the patterns for layers 10-1, 10-2, and 10-3 while the photomask need only be used once in forming a deposition mask for layer 10-4. The photomask may be used in a series of four offset exposures to form each of the patterns for layers 10-1, 10-2, and 10-3. A sample offsetting pattern and resulting exposed masking material is shown in the top views of FIGS. 10B–10F where it is assumed a pattern corresponding to layer 10-1 is desired to be formed. FIG. 10B depicts the masking material 226 located within a boundary region 228 corresponding to the region for layer 10-1 that is to be exposed via opening 224. FIG. 10B depicts the photomask opening 224 located over the lower left quadrant of boundary region 228. While located in this position, a partial exposure of region 228 occurs. FIG. 1C depicts opening 224 after it has been moved from the lower left quadrant to the lower right quadrant and region 230 of the masking material has been exposed. Again, while the opening in the photomask is in this second position, a second portion of the masking material is exposed. FIGS. 10D and 10E depict two more steps in the positioning of the photomask while FIG. 10F depicts that the entire region within boundary 228 has been exposed. The created deposition mask may be used in forming layer 10-1. A similar series of steps may be used to allow the same photomask to create deposition masks for layers 10-2 and 10-3. As can be seen, from this example, in certain circumstances, thinner layers may be formed without resorting to a need to produce additional photomasks or other patterning tools.

In some alternative embodiments, selective patterning of photoresist deposition masks may occur using two or more photomasks. Though the number of photomasks used for any given layer may be increased, such groups of photomasks may be used for the formation of multiple layers and a net reduction in the number of photomasks required may still be possible. During the formation of some layers, it may be undesirable for an entire photomask to be orbited, or otherwise moved, as it may not be desirable for all boundary regions defined by the mask to undergo discontinuity reduction or at least discontinuity reduction associated with a given orbital pattern or size. Orbiting of a single mask may not be allowed, e.g., when undesired discontinuities exist only on portions of the boundary of a layer and the layer configuration doesn't allow orbiting of a single mask to occur, the layer may be divided into two or more regions where the at least portions of the separate regions will undergo different positioning and offsetting regiments of separate photomasks such that accurate layer formation can occur while still using fewer photomasks than would otherwise be required (i.e. fewer than one photomask per unique area per layer of the structure that is to be formed).

Figure 11A:
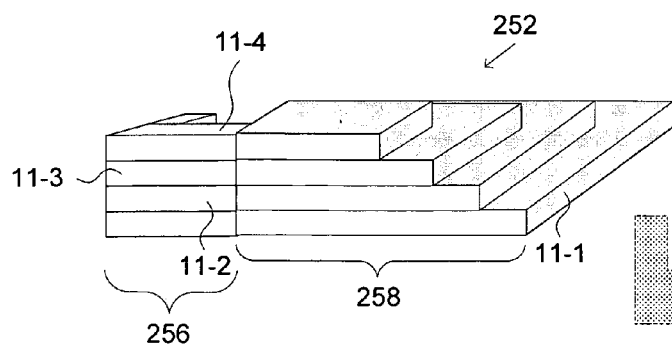
FIGS. 11(a)–11(f) provide an example of a structure which has a configuration such that each of the four layers cannot have deposition or etching masks created using the orbiting or other movement of a single photomask.
Figure 11B:
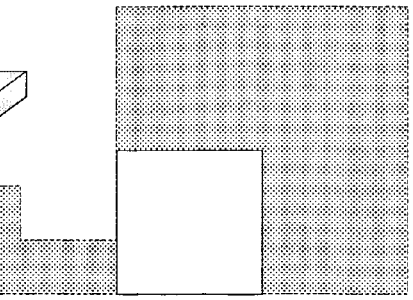
Figure 11C:
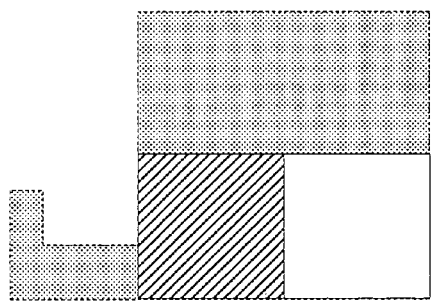
Figure 11D:
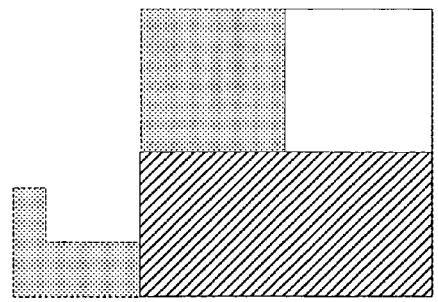
Figure 11E:
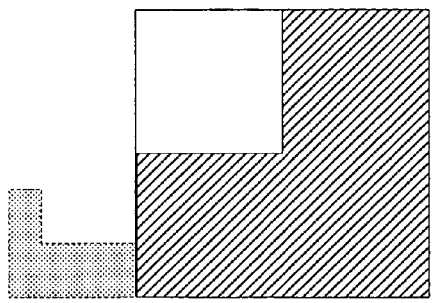
Figure 11F:
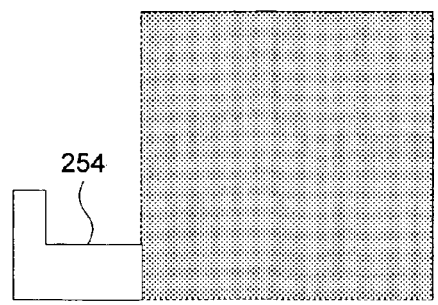

FIGS. 11A–11F provide an example of a structure 252 which has a configuration such that each of the four layers, 11-1 to 11-4, cannot have deposition or etching masks created using the orbiting or other movement of a single photomask. In this example, it is possible to form each layer using two photomasks where each photomask includes an opening corresponding to a portion of layer. One of the photomasks is identical to that discussed above in association with the example of FIGS. 10A–10F and the other mask has a shape corresponding to the finger-like appendage that exists on each of layers 11-1 to 11-4. FIG. 11A provides a perspective view of the structure 252 including the finger-like appendage 256 which extends through the four layers without offset and the rectangular patch area 258 of the structure that undergoes size changes from layer-to-layer. FIGS. 11B–11E depict top views of the formation of a deposition or etching mask corresponding to layer 11-1 wherein a first photomask is used during multiple exposures to expose the rectangular portion of the layer. FIG. 11F depicts an opening 254 for a second photomask that may be used in exposing the final portion of the deposition or etching mask material.

Second Group of Embodiments

In a second group of embodiments, chemical or electrochemical etching is used to shape sidewalls of the layers of deposited structural material after it is released from a sacrificial material. In some variations of this embodiment, chemical etching occurs after all layers are completed and the sacrificial material is removed. In other variations, discontinuity reduction may occur prior to completion of all layers wherein sacrificial material will be removed, the discontinuities reduced by chemical etching, and then a sacrificial material is reapplied and building continued. In some such alternatives, the reapplication of sacrificial material deposits a different material than what was originally used wherein the different sacrificial material has the ability of being differentially released from the structural material and from the other sacrificial material. In still other variations, the chemical etching process may be replaced by an electrochemical etching process. In even other variations, the discontinuity reduction may be performed without regard to the final dimensions of the structure but instead with only focus given to reducing discontinuities while in other variations, the discontinuity reduction operation(s) may be tied to an original sizing of the structure such that the final dimensions of the structure are appropriately matched to desired dimensions. In further variations, etching operations may be applied to only selected portions of the structure via directed application of etchant, via shielding applied to different regions of the structure, or the like.

Figure 12:
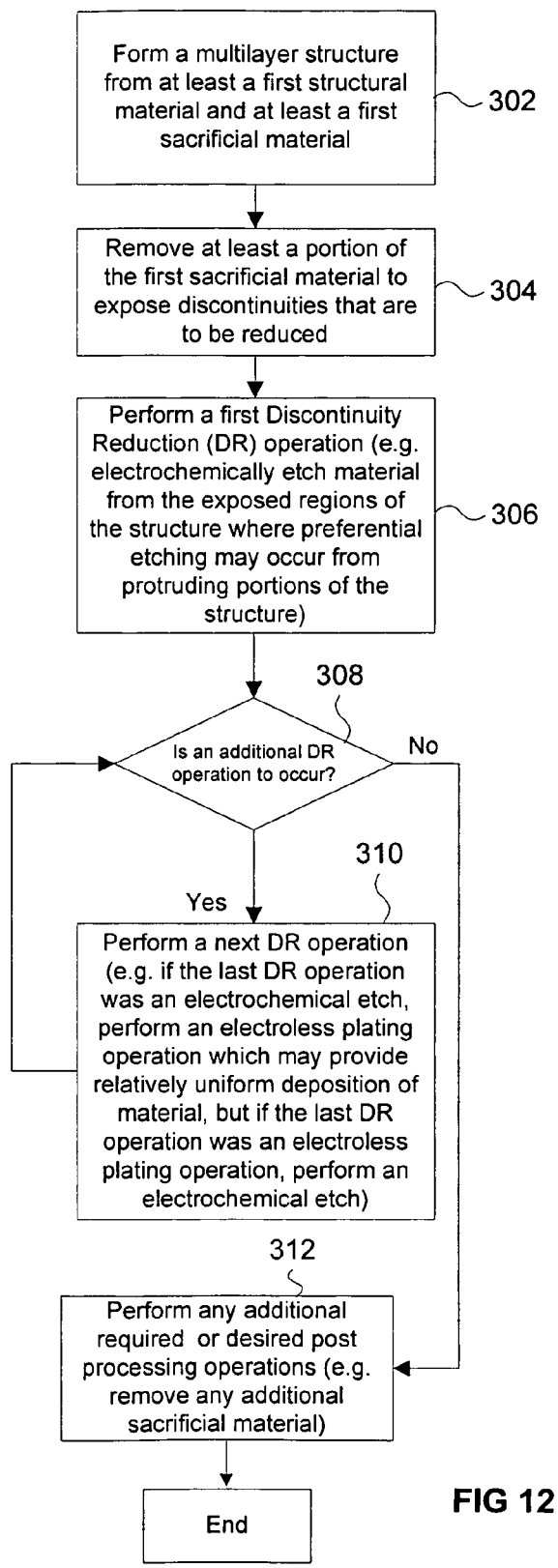
FIG. 12 provides a flow chart of a first illustrative embodiment of the first group of embodiments.

FIG. 12 provides a flowchart llustrative of the second group of embodiments. The process of FIG. 12 begins with block 302 which calls for formation of a multilayer structure. The process then proceeds to block 304 which calls for removal of at least a portion of a sacrificial material used in fabricating the structure. The sacrificial material is removed from at least those regions where discontinuity reduction is to occur. Next the process moves forward to block 306 which calls for performing a first discontinuity reduction operation. This operation may for example be an electrochemical etch or a chemical etch. Alternatively, for example, this first operation may involve a deposition that fills portions of the voids that form part of the discontinuities. The process next moves forward to block 308 which enquires as to whether another discontinuity reduction operation will be performed. Next the process moves forward to either block 312, if no additional discontinuity reduction operation is to occur, or alternatively it moves forward to block 310 if at least one additional discontinuity operation is to be performed. Block 312 calls for the performance of any additional post processing operations after which the process terminates at block 314. Block 310 calls for the performance of the next discontinuity reduction operation which may, for example, be an additional etching operation or a deposition operation. If an etching operation, it may use a different etchant or etching process than any previous operation or it may use the same etchant and/or etching operation. The operations of block 306 and 310 may be coordinated to result in a smoothing of the surface without significantly shifting of the positioning of the region or it may either build up material in the region or remove material from the region depending on whether or not an attempt is being made to match the dimensions of the structure to those of an original design. From block 310 the process loops back to block 308.

Figure 13A:
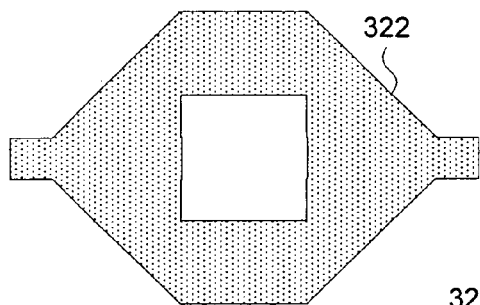
FIGS. 13(a)–13(g) provide an illustration of an embodiment taken from the second group of embodiments.
Figure 13B:
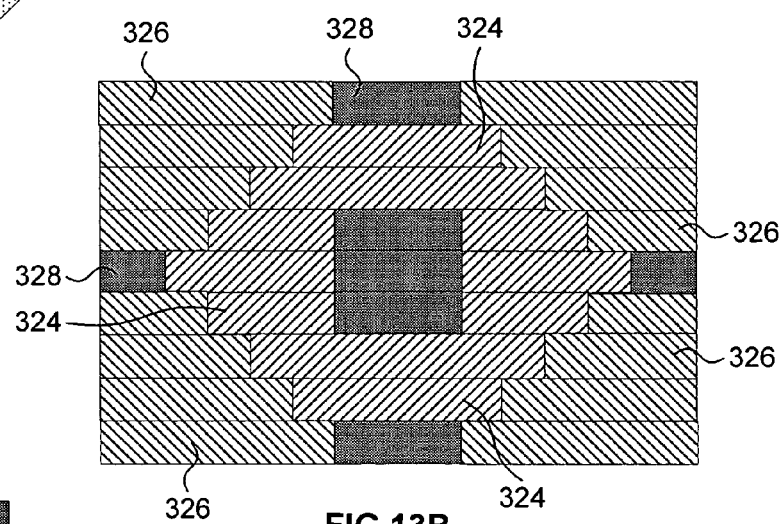
Figure 13C:
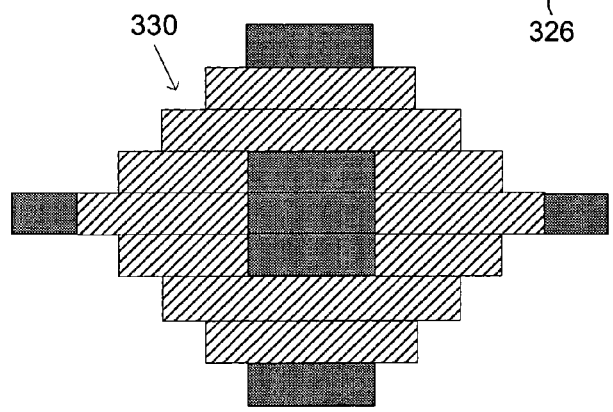
Figure 13D:
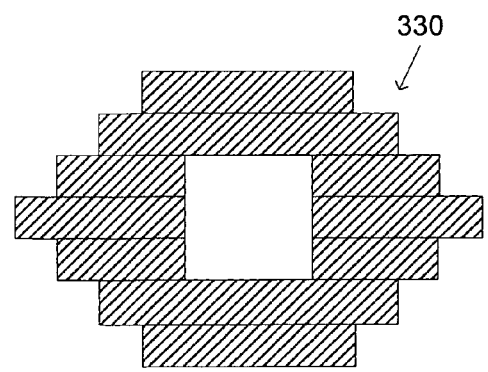
Figure 13E:
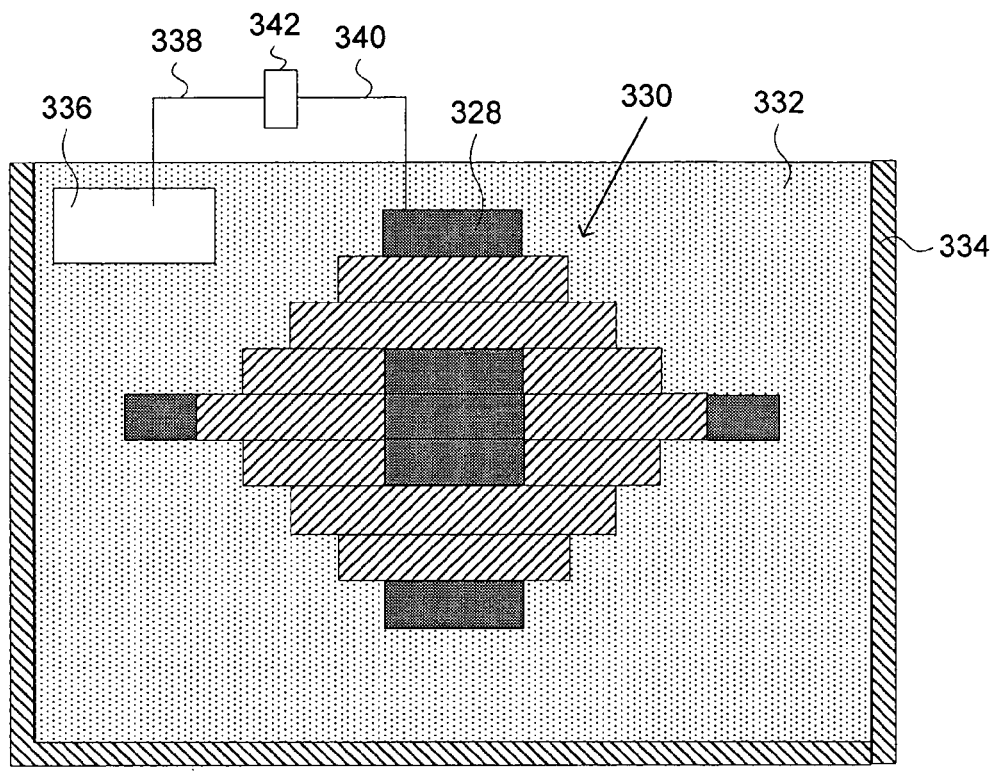
Figure 13F:
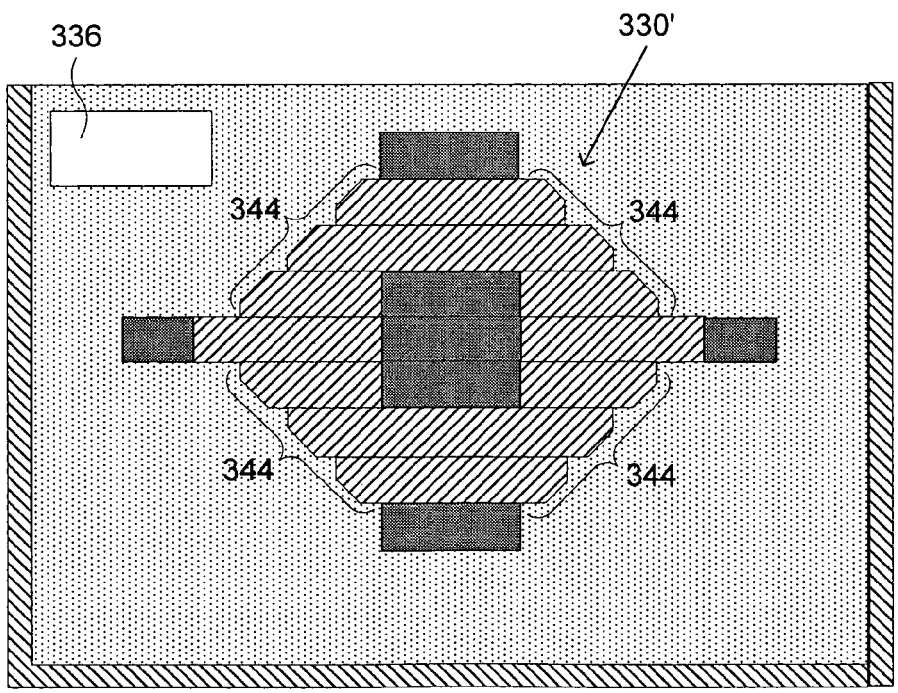
Figure 13G:
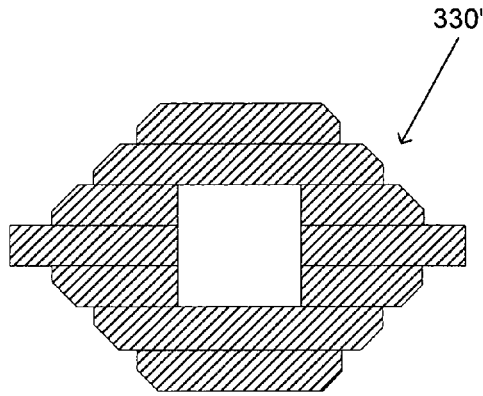

FIGS. 13A–13G provide an example of an embodiment of the second group of embodiments. FIG. 13A depicts a side view of the design 322 of a structure that is desired to be formed. FIG. 13B depicts a side view of the structure as formed from a structural material 324 and as embedded in a first sacrificial material 326 and a second sacrificial material 328. FIG. 13C depicts a side view of the structure 330 after the first sacrificial material 326 has been removed. FIG. 13D depicts a side view of the structure 330 as it would appear after removal of the second sacrificial material 328 and if no discontinuity reduction was to occur. FIG. 13E depicts a side view of the structure 330 and second sacrificial material 328 immersed in electrochemical etchant 332 that is held in container 334. In addition to holding the structure, container 334 also holds an electrode 336 that may function as a cathode. Lead 338 and 340 connect a power supply 342 to the structure 330 (as shown in this example lead 340 connects to structure 330 via sacrificial material 328) and the electrode 336. The power supply may be used to bias the electrode 336 and structure 330 to become a cathode and an anode, respectively. In this configuration the power supply may be used to electrochemically etch material from the structure. It should be noted that as etching from the structure occurs sacrificial material 338 may also be removed. FIG. 13F depicts a side view of the structure 330' after etching has occurred and at least some smoothing of the discontinuities 344 has been achieved. FIG. 13G depicts the state of the process after structure 330' has been removed from the etching system and any remaining second sacrificial material removed.

Third Group of Embodiments

In a third group of embodiments, material is deposited to a surface of the structural material after the structure, or at least part of the structure is released from a sacrificial material. The depositing may occur in a variety of ways, such as for example, by electroplating, electroless deposition, electrophoretic deposition, electrostatic coating, and the like.

An example of a relatively complex version of such an embodiment involves the formation of a structure of desired configuration, whether recessed or protruding, applying a coating of a non-conductive material primarily to the peaks of the discontinuities (e.g. by electrophoretic deposition, electrostatic deposition or powder-type coating). If the deposition operation does not limit the deposition locations to the peaks, an etching operation that attacks the non-conductive material may be applied in a controlled manner such that thinner regions of non-conductive material (e.g. in the recesses of the discontinuities) are removed but at least some non-conductive material remains on the peaks to shield them. Next an electrodeposition operation is used to deposit a conductive material preferentially into the recessed regions thereby yielding some smoothing of the discontinuities. Repeated depositions or alternating depositions and etching may be used to further improve the smoothness of the surface. Next, the non-conductive shielding material is removed and if desired further electrodepositions or etching may be performed to further enhance the smoothness.

As the flowchart of FIG. 12 allows for the deposition of material to provide smoothing of discontinuities, certain alternatives of the flowchart of FIG. 12 fall within both the second and third groups of embodiments.

Fourth Group of Embodiments

A fourth group of embodiments combines the use of etching and deposition operations to reduce surface discontinuities. In these embodiments a single etching process and deposition process may be used but more preferably a plurality of etching and deposition operations are alternated. In variations within this group of embodiments, the extent of etching in each step may be larger than, substantially equal to, or even less than the amount of deposition used in the intermediate operations and as such the average position of sidewalls of the structural material may be changed. Processes according to this group of embodiments fall within some alternatives that are within the generic process illustrated in the flowchart of FIG. 12.

Fifth to Seventh Groups of Embodiments

In a fifth through seventh embodiments of the invention, the techniques of the second through fourth embodiments may be applied on a layer-by-layer basis. The etching, deposition, or combination of the two may operate on a structural material or on a sacrificial material. If operating on a sacrificial material, the reduced discontinuities may be transferred from the sacrificial material to the structural material.

Figure 14:
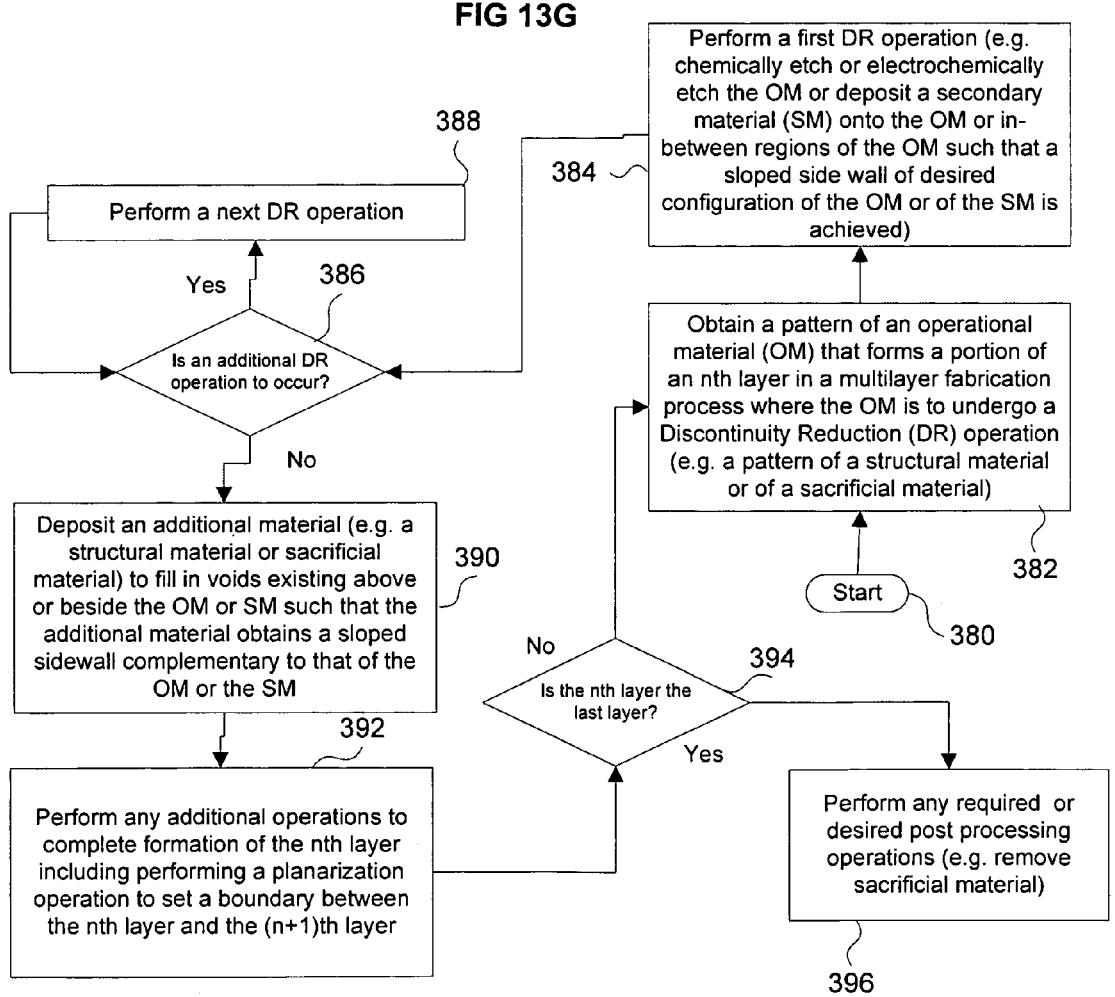
FIG. 14 provides a flowchart illustrating an example of a process according to an additional embodiment of the invention.

A flowchart illustrating an example process that is generic to the fifth through seventh and ninth embodiments of the invention is set forth in FIG. 14. The process of FIG. 14 begins with block 380 and proceeds to block 382 which calls for the obtaining of a pattern of an operational material that forms a portion of an nth layer in a multilayer fabrication process where the operational material is to undergo a discontinuity reduction operation. The operational material may be a structural material or a sacrificial material. It may be a dielectric material or a conductive material. The discontinuity reduction operation may operate to modify the shape of the operational material or it may act in such a manner that it uses the operational material as a mandrel for shaping a deposition or etching operation that is performed by the discontinuity reduction operation.

Next the process moves to block 384 which calls for the performance of a first discontinuity reduction operation. For example, the operation may perform a chemical etch or electrochemical etch of the operational material or it may deposit a secondary material onto the operational material or in-between regions of the operational material such that a sloped side wall of desired configuration of the operational material or of the secondary material is achieved.

Next the process moves forward to block 386 which enquires as to whether an additional discontinuity reduction operation is to occur. If the response to the enquiry of block 386 is "yes", the process move to block 388 which calls for the performance of a next discontinuity reduction operation after which the process loops back to block 386.

If the response to the enquiry of block 386 is "no", the process moves forward to block 390 which calls for the deposition of an additional material. The additional material may be a structural material or sacrificial material. This additional material will fill in voids existing above or beside the operational material of the secondary material such that the additional material obtains a sloped sidewall complementary to that of the operational material or the secondary material.

Next the process moves forward to block 392 which calls for the performance of any additional operations to complete formation of the nth layer including performing a planarization operation to set a boundary between the nth layer and the (n+1)th layer.

Next the process moves forward to block 394 which enquires as to whether the nth layer is the last layer. If the answer is "yes" the process moves forward to block 396 which calls for the performance of any required or desired post processing operations (e.g. removal of sacrificial material). If the answer to the enquiry of block 394 is "no" the process loops back to block 382

Eighth Group of Embodiments

In an eighth group of embodiments, deposition masks are provided with sidewalls which are off angle to the build axis and which may be used to form sidewalls of structural or sacrificial material that more directly result in at least some portions of at least some layers of structural material having sidewalls that are more closely matched to a desired slope of the structure.

Sloped sidewalls of deposition masks may be obtained in a variety of ways. For example, adhered masks may undergo bombardment that rounds off corners or chemical etching with an etchant that preferentially attacks the mask material without attacking the bond between the substrate and the mask material and which results in preferential reduction of corners. As another example, an abrasive may be applied to the mask such that the corners of discontinuities are preferentially rounded.

Ninth Group of Embodiments

In a ninth group of embodiments, at least partial discontinuity reduction may be achieved during the patterning of material for each layer by etching into a first deposited material (e.g. chemically or electrochemically) such that differential exposure to etchant or etching operations causes more removal near the top of a layer of material than near the bottom of the layer. After the patterning operations, one or more materials are deposited which take on the shape of the pattern created by the etching operations. In some variations, the material etched into may be a structural material while in other variations the material may be a sacrificial material. As such, sidewalls of the structural material associated with the layer may take on a non-build axis orientation. Such orientation may yield an upward facing slope (i.e. up-facing feature) or a downward facing slope (down-facing feature).

Tenth Group of Embodiments

In a tenth group of embodiments, multi-step etching or depositions may be used to form slopped sidewalls in a first deposited material for each layer by performing each etch to a depth or deposition to a thickness which is a fraction of the layer thickness and changing the openings sizes of the masks between each successive etch or deposition.

In some embodiments, etching operations are used and the mask size is incremented from that which is smaller than the intended opening size at the bottom of a layer to that which is substantially equal to or only slightly smaller than the desired opening size at the top of the layer.

In some embodiments, deposition operations are used with successive masks decreasing in size from that desired for the bottom of the layer to that desired for the top of the layer.

In some embodiments, depositions are used with the sizing of masks incrementing from equal to or somewhat smaller than the desired dimension at the top of the layer while the last mask has an opening dimension that is substantially equal to the desired dimensions at the base of the layer.

In these embodiments, after etching or depositions form patterns of desired depth or height of the first material, a second material is deposited and then the layer is planarized.

These embodiments result in either up-facing or down-facing slopes of the sidewalls of the structural material depending on whether the structural material was the first deposited material or the second deposited material.

Eleventh Group of Embodiments

In an eleventh group of embodiments of the invention, instead of forming the structure where discontinuities in the structure are reduced during or after formation of the structure, a tool may be formed and the discontinuity of its sidewalls reduced and thereafter the tool may be used to form the desired configuration from structural material, for example by depositing the structural material into a void in the tool.

In one example of such an embodiment, a recessed structure may be formed which is the 3D complement of a desired 3D structure. The recessed structure may be made from sacrificial material. Its surface discontinuities may be reduced by any or the various processes discussed herein and thereafter structural material may be deposited into the recess or void, the resulting structure planarized if necessary, the structural material bonded to an appropriate substrate (if necessary) and the sacrificial material removed.

Twelfth Group of Embodiments

In a twelfth group of embodiments of the invention composite structures may be formed in the process of reducing surface discontinuities.

In example of such an embodiment may start with the creation of a protruding structure of desired configuration. The structure may then be coated with a polymer or other dielectric material via electrostatic, electrophoretic, powder coating, spraying or the like. If the deposited coating is not of sufficient smoothness, the coating may be heated to allow surface tension to aid in the smoothing of the coating. The structure may be used in its current form or alternatively it may undergo further processing. For example, the further processing may include deposition of a seed layer and the electrodeposition of a coating metal.

Thirteenth Group of Embodiments

In a thirteenth group of embodiments, the deposition or combination deposition and etching discontinuity reduction techniques may be used to smooth the surface and then a different structural material may be plated or otherwise deposited to the surface of the smoothed structure.

Fourteenth Group of Embodiments

In a fourteenth group of embodiments, portions of a structural material (e.g. peaks of the discontinuities) are modified to increase their ability to be etched by a given solvent, the solvent is then applied and the modified regions removed. For example, if the structural material is nickel, diffusion of sacrificial material into the nickel may enhance the ability of the nickel to be attacked by a copper etchant. As it is believed that diffusion will be greatest at the peaks of the discontinuities, it is believed that enhanced etching from those locations may be obtainable and thus the ability to reduce the discontinuities achievable. In other examples, the nickel surface may be bombarded by copper or other metal particles, thereby allowing mechanical reshaping of the surface near the peaks of the discontinuities as well as the potential for allowing enhanced ability for chemical reshaping.

Fifthteenth Group of Embodiments

In a fifthteenth group of embodiments electrical discharges may be used to smooth out discontinuities in a structural material or in a sacrificial material (which will be thereafter transferred to a structural material) either by mechanical bombardment of ions or by heating caused by such bombardment enhancing the ability of the material to flow. In some examples of this type of embodiment, selected regions of the material may be protected so that smoothing of associated features is minimized.

FURTHER VARIATIONS

The various embodiments set forth above or otherwise understood from the teachings herein (either by combining embodiments or otherwise) may be selectively implemented in a variety of ways thereby allowing some features to undergo a first amount of smoothing while other regions undergo different amounts of smoothing. For example, the smoothing techniques described herein may be applied between two steps of a multi-step release operation. As another example, application of protective materials to some regions may occur after release of a structure from sacrificial material but prior to smoothing.

The various embodiments of the invention may also involve the use of modified data representing the structure to be formed wherein the modified data takes into consideration the structure sizing changes that may result from application of any particular discontinuity reduction technique. For example, in some embodiments, the discontinuous regions of layers may be located in undersized or oversized positions relative to a desired position for the final surface. If in an oversized position, etching away of the discontinuities may bring the structure back to its desired position. If in an undersized position, adding of material to the recesses of the voids may bring the surface to a more desired position. If etching operations not only attack the peaks of the discontinuities, super-oversized structures may be required to ensure that the final surface position appropriately corresponds to the desired surface position. If deposition operations yield deposits of material not only into the recesses of the discontinuities but also to the peaks, or in other regions also, then super-undersized structures may be required to ensure that the final surface position appropriately corresponds to the desired surface position. In embodiments where only up-facing regions are smoothed, it may be desirable to modify the data associated with the structure such that the final produced structure is dimensioned properly. The converse may hold when only down-facing features are being smoothed. In still other embodiments, the dimensions of the final structure may be less critical than the overall shape of the structure and thus no special sizing techniques may be needed.

Some embodiments of the present invention may be used to reduce layer-to-layer discontinuities that do not result from different data representations on successive layers but instead result from differences solely in the dimensions of the layer near its bottom and near its top. Some embodiments may also be used to reduce intra-layer discontinuities as well.

Various other embodiments of the present invention exist. Some of these embodiments may be based on a combination of the teachings herein with various teachings incorporated herein by reference. Some embodiments may not use any blanket deposition process and/or they may not use a planarization process. Some embodiments may involve the selective deposition of a plurality of different materials on a single layer or on different layers. Some embodiments may use blanket depositions processes that are not electrodeposition processes. Some embodiments may use selective deposition processes on some layers that are not electrodeposition processes. Some embodiments may use one or more structural materials (e.g. nickel, gold, copper, or silver). Still other processes may use other materials whether or not electrodepositable. Some processes may use one or more sacrificial materials (e.g. copper). Some embodiments may use copper as the structural material with or without a sacrificial material. In some embodiments, the depth of deposition may be enhanced by separating a conformable contact mask away from the substrate as deposition is occurring in a manner that allows the seal between the conformable portion of the mask and the substrate to shift from the face of the conformal material to the inside edges of the conformable material.

In view of the teachings herein, many further embodiments, alternatives in design and uses of the instant invention will be apparent to those of skill in the art. As such, it is not intended that the invention be limited to the particular illustrative embodiments, alternatives, and uses described above but instead that it be solely limited by the claims presented hereafter.

We claim:

1. A method for electrochemically forming a three-dimensional structure from a plurality of adhered layers, comprising:

providing a substrate;

forming a layer comprising a structural material and a sacrificial material, wherein at least one of the structural material or sacrificial material is electrodeposited on to the substrate;

forming subsequent layers adhered to previously formed layers wherein either the quantization of layers results in unintended interlayer discontinuities or build processes result in offset features or non-vertical sidewall features; and wherein prior to completing formation of all layers or after completing formation of all layers, performing at least one operation, comprising an etching operation, that results in reduction of quantization based interlayer discontinuities, offset features, or non-vertical sidewall features.

2. The method of claim 1 wherein the at least one operation operates, after removal of sacrificial material, on structural material located on a plurality of layers simultaneously.

3. The method of claim 2 wherein the at least one operation comprises and operation selected from the group consisting of a chemical etching operations and or an electrochemical etching operation.

4. The method of claim 1 wherein the at least one operation operates on one given layer at a time during formation of that given layer.

5. The method of claim 4 wherein the at least one operation operates on a first deposited material after the first deposited material is deposited to a height that is at least as great as a thickness of the given layer and prior to depositing a second material that will form a portion of the given layer.

6. The method of claim 4 wherein the structural material comprises a first deposited material and the sacrificial material comprises a second deposited material, wherein the first deposited material is selectively deposited into an opening in an adhered mask.

7. The method of claim 4 wherein the sacrificial material comprises a first deposited material and the structural material comprises a second deposited material, wherein the first deposited material is selectively deposited into an opening in an adhered mask.

8. The method of claim 4 wherein the at least one operation comprises a plurality of etching operations using masks of varied size that etch into the first deposited material on the given layer prior to depositing the second material.

9. The method of claim 1 wherein the plurality of layers are formed using a total of N distinct selective deposition operations or selective etching operations wherein one or more of the materials forming the layers are patterned, wherein photomasks are used to produce deposition or etching masks and where the number of photomasks used to produce the deposition or etching masks is less than N.

10. A method for electrochemically forming a three-dimensional structure, comprising:

providing a substrate;

forming a layer comprising a structural material and a sacrificial material, wherein at least one of the structural material or sacrificial material is electrodeposited on to the substrate;

forming subsequent layers adhered to previously formed layers wherein either the quantization of layers results in unintended interlayer discontinuities or build processes result in offset features or non-vertical sidewall features; and wherein prior to completing formation of all layers or after completing formation of all layers, performing at least one operation, comprising a deposition operation, that results in the reduction of quantization based interlayer discontinuities, offset features, or non-vertical sidewall features.

11. The method of claim 10 wherein the at least one operation operates, after removal of sacrificial material, on structural material located on a plurality of layers simultaneously.

12. The method of claim 10 wherein the at least one operation comprises an operation selected from the group comprising: an electrodeposition operation, an electroless deposition operation, a powder coating operation, electrophoretic deposition operation, and a spraying operation.

13. The method of claim 10 wherein the at least one operation operates on one given layer at a time during formation of that given layer.

14. The method of claim 13 wherein the at least one operation comprises depositing the first material in a plurality of operations where a mask size is varied and where after a second material is deposited to form part of the layer.

15. The method of claim 13 wherein the at least one operation operates on a first deposited material after the first deposited material is deposited to a height that is at least as great as a thickness of the given layer and prior to depositing a second material that will form a portion of the given layer.

16. The method of claim 13 wherein the at least one operation comprises a plurality of deposition operations using masks of varied size that build up the first deposited material on the given layer prior to depositing the second material.

17. A method for electrochemically forming a three-dimensional structure from a plurality of adhered layers, comprising:

providing a substrate;

forming a layer comprising a structural material and a sacrificial material, wherein at least one of the structural material or sacrificial material is electrodeposited on to the substrate;

forming subsequent layers adhered to previously formed layers wherein either the quantization of layers results in unintended interlayer discontinuities or build processes result in offset features or non-vertical sidewall features; and wherein prior to completing formation of all layers or after completing formation of all layers, performing at least two operations, comprising an etching operation and a deposition operation, that result in reduction of quantization based interlayer discontinuities, offset features, or non-vertical sidewall features.

18. The method of claim 17 wherein the at least two operations operate, after removal of sacrificial material, on structural material located on a plurality of layers simultaneously.

19. The method of claim 17 wherein the at least two operations operate on one given layer at a time during formation of that given layer.

20. The method of claim 17 wherein the at least two operations comprise at least one etching operation followed by at least one deposition operation followed by at least one etching operation.

* * * * *